(12) United States Patent
Chastain

(10) Patent No.: US 8,096,402 B2
(45) Date of Patent: Jan. 17, 2012

(54) SORTER HAVING A CONTAINER SHUTTLE SYSTEM

(75) Inventor: David P. Chastain, New Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 206 days.

(21) Appl. No.: 12/650,024

(22) Filed: Dec. 30, 2009

(65) Prior Publication Data

US 2011/0155544 A1 Jun. 30, 2011

(51) Int. Cl.
*B65G 29/00* (2006.01)
(52) U.S. Cl. ........... 198/369.7; 198/370.05; 209/900; 414/222.07
(58) Field of Classification Search ........... 198/346.1, 198/346.2, 369.7, 369.2, 370.05; 209/900; 414/222.07
See application file for complete search history.

(56) References Cited

U.S. PATENT DOCUMENTS

| | | | | |
|---|---|---|---|---|
| 4,852,715 A * | 8/1989 | Kmetz | ............... | 198/369.2 |
| 6,024,425 A * | 2/2000 | Imai et al. | ............... | 312/35 |
| 6,227,376 B1 * | 5/2001 | Handel et al. | ............... | 209/606 |
| 6,897,395 B2 * | 5/2005 | Shiibashi et al. | ............... | 209/584 |
| 7,156,220 B2 * | 1/2007 | Olson et al. | ............... | 198/465.1 |

FOREIGN PATENT DOCUMENTS

DE 4202244 A1 * 7/1993
EP 56063 A1 * 7/1982

* cited by examiner

*Primary Examiner* — Mark A Deuble
(74) *Attorney, Agent, or Firm* — Michael J. Cummings; Charles R. Malandra, Jr.; Steven J. Shapiro

(57) ABSTRACT

A sorter system includes a first conveyor for transporting items to designated containers, a second conveyor for transporting containers containing the items, and a shuttle unit. The shuttle unit may include a base defining a loading area proximate to the first conveyor and a staging area proximate to the second conveyor and a tray disposed on the base for receiving containers on a first section and a second section. The tray may be movable between a first position in which the first section is in the loading area and a second position in which the first section is in the staging area. The shuttle unit may further include a transport device for selectively moving a container on the first section of the tray from the staging area onto the second conveyor.

21 Claims, 3 Drawing Sheets

SORTER HAVING A CONTAINER SHUTTLE SYSTEM

FIELD OF THE INVENTION

The present invention relates to a sorter and, more particularly, to a sorter having a container shuttle system.

BACKGROUND OF THE INVENTION

Sorter systems are known in the art. These systems sort completed mailpieces and direct the mailpieces to storage pockets or bins, depending on the system's configuration. The mailpieces are directed to the particular bins based on a predetermined sorting scheme. Typical sorting schemes involve sorting mailpieces based on a common destination, such as a geographic region or a common postal code, for example.

In typical conventional sorting systems, once a bin is full, an operator is notified by an indicator light, for example. The operator must then clear the full bin and replace it with an empty one to allow the sorter system to continue operating. Handling heavy bins may create difficulties for the sorter system operator. Those difficulties may be further compounded where the bins are arranged on multiple levels, requiring overhead lifting.

In addition, in some cases, the sorter system is shut down when one or more pockets or bins are full to allow for their replacement. Thus, the refilling of bins may adversely affect the efficiency of the sorting operation.

Attempts have been made to automate bin handling in sorter systems, but conventional systems have been overly large and complex.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

In accordance with the purpose of the invention, as embodied and broadly described herein, one aspect of the invention relates to a sorter system comprising a first conveyor for transporting items to designated containers, a second conveyor for transporting containers containing the items, and a shuttle unit.

In one embodiment, the shuttle unit comprises a base defining a loading area proximate to the first conveyor and a staging area proximate to the second conveyor. The shuttle unit may further comprise a tray disposed on the base for receiving containers on a first section and a second section. The tray may be movable between a first position in which the first section is in the loading area and a second position in which the first section is in the staging area.

In a further embodiment, the shuttle unit comprises a transport device for selectively moving a container on the first section of the tray from the staging area onto the second conveyor.

As used herein, "items" include papers, documents, postcards, envelopes, brochures, enclosures, booklets, magazines, media items, including CDs, DVDs, computer disks, and/or other digital storage media, and packages having a range of sizes and materials. The items may be unwrapped or may be covered with a wrapping material such as paper, a polymer wrap, such as polyethylene, for example, or other wrapping material.

Further, as used herein, "container" means a bin, a pocket, or other storage unit used to contain items.

In another aspect, the invention relates to a method of sorting items comprising transporting items to designated containers using a first conveyor, transporting containers containing the items using a second conveyor, and receiving containers on a first section and a second section of a tray. The tray may be disposed on a base that defines a loading area proximate to the first conveyor and a staging area proximate to the second conveyor.

In one embodiment, the method further comprises moving the tray between a first position in which the first section is in the loading area and a second position in which the first section is in the staging area, and selectively moving a container on the first section of the tray from the staging area onto the second conveyor using a transport device.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

DETAILED DESCRIPTION OF EXEMPLARY EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Embodiments of the system according to the invention are described with reference to certain applications in mailpiece sorter systems. It should be understood, however, that embodiments of the invention may be used in association with other systems configured to handle and transport items. Further, many sorter systems are modular and may include more or fewer modules than those described herein based on the particular application.

Figure 1:
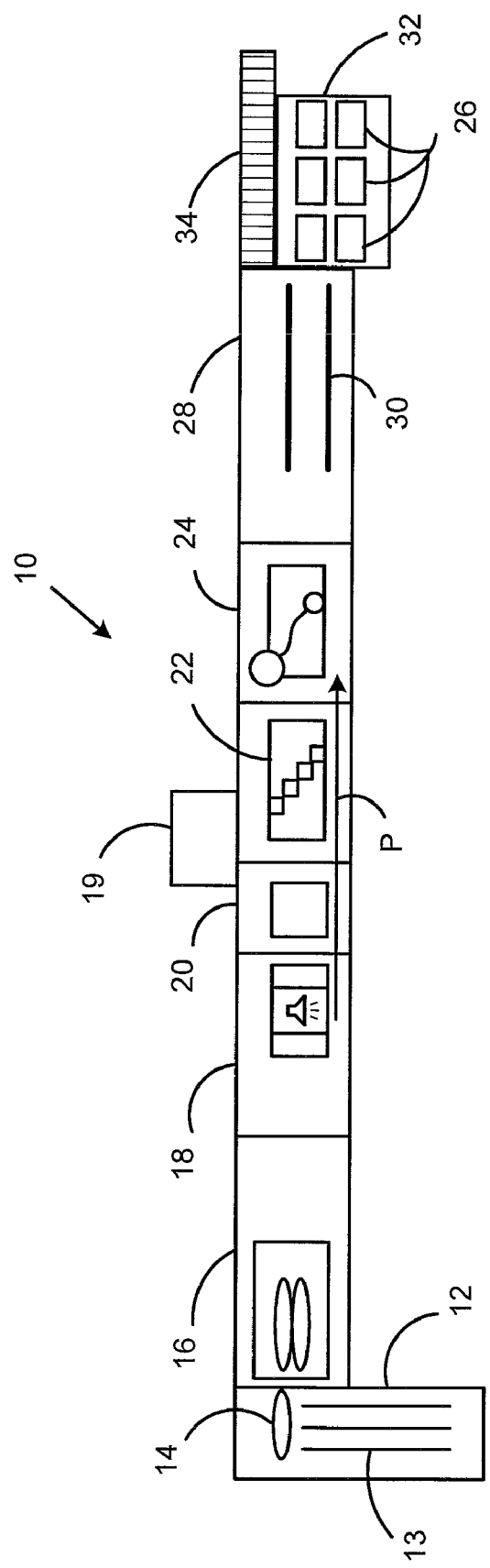
FIG. 1 is a schematic view of a sorter system utilizing an embodiment of a container shuttle system according to the invention.

A sorter system 10 utilizing an embodiment of a container shuttle system according to the invention is shown in FIG. 1. The sorter system 10 includes a feeder module 12 for feeding items for sorting. In one embodiment, the items are arranged on the feeder on edge and advanced using a conveyor 13, for example, towards a feeder belt 14, shown schematically in FIG. 1. Other feeding arrangements may also be used.

In this embodiment, the feeder belt 14 is configured to contact a surface of an approaching item and to redirect the item's direction of travel substantially perpendicularly to advance the item for downstream processing. The feeder belt 14 may feed a single item at a time. Often, however, contact between items causes multiple items to advance. The multiple items may be overlapping to various degrees.

From the feeder module 12, the items are fed to a singulation module 16, which singulates the overlapping items to ensure that only one item at a time is processed by the system. The singulated items are fed along a transport path P for processing by various modules. Many item processing systems, such as mailpiece handling systems, for example, optimally process items that are spaced apart at a predetermined pitch.

The items next pass through a scanning module 18, where an image of at least a portion of each item is obtained. The scanned image may be used by the controller 19 to determine the destination container for the item. In the illustrated sorter system 10, the items then pass through a weighing module 20, where the weight of the item is obtained.

In some applications, a sorter system is used to apply markings, such as an address or code, for example, to the face of items being processed. Such markings may be added using a printer or labeler. Both a printing module 22 and a labeling module 24 are included in the illustrated sorter system 10.

Figure 2:
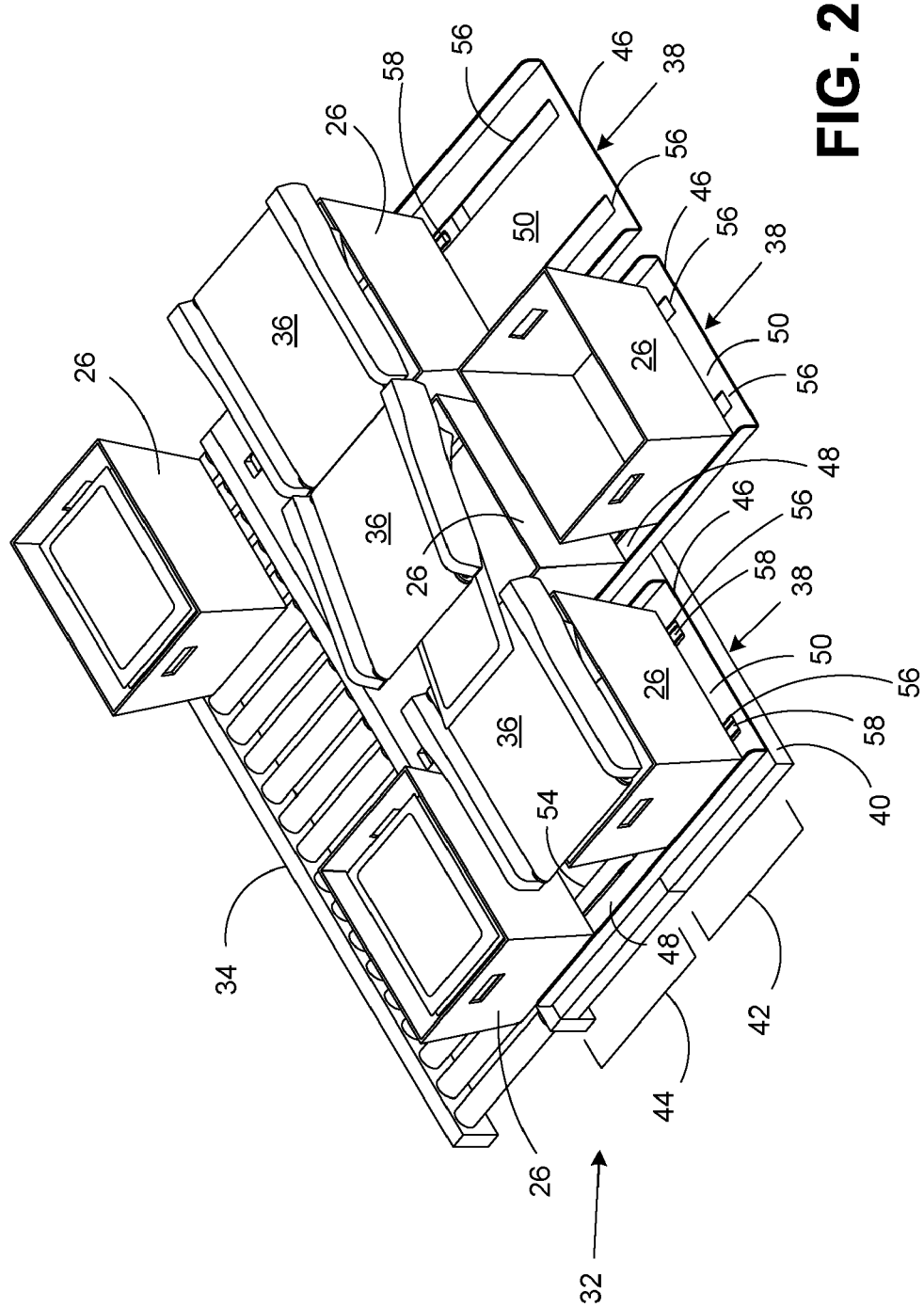
FIG. 2 is a perspective view of a portion of the sorter system of FIG. 1.

Finally, the items are directed to the destination container 26 using a conveyor module 28 having a first conveyor 30. For systems with containers 26 on multiple levels, an elevator arrangement (not shown) may be used to move the items to the appropriate level. A plurality of containers 26 are shown in FIG. 2 arranged on an embodiment of the container shuttle system 32 according to the invention. As discussed below, containers 26 are transported from the container shuttle system 32 using a second conveyor 34.

The sorter system 10 utilizing embodiments of the container shuttle system 32 may limit operator injury by minimizing or eliminating handling of heavy containers and may improve the overall efficiency of the sorting operation through optimization of container allocation and automation of the removal and placement of containers. In addition, due to the low profile of the container shuttle system 32, containers may be nested (e.g., stacked) in some embodiments, allowing for greater sorting density and associated increased operational efficiency.

According to an embodiment of the invention, the sorter system 10 comprises a first conveyor 30 for transporting items to designated containers 26. Diverters 36 are provided, as shown in FIG. 2, for directing items from the first conveyor 30 into a designated container 26. The sorter system 10 further comprises a second conveyor 34 for transporting containers 26 containing the items. The second conveyor 34 may transport the containers 26 away from the sorter system 10 for further processing and/or delivery.

Figure 3:
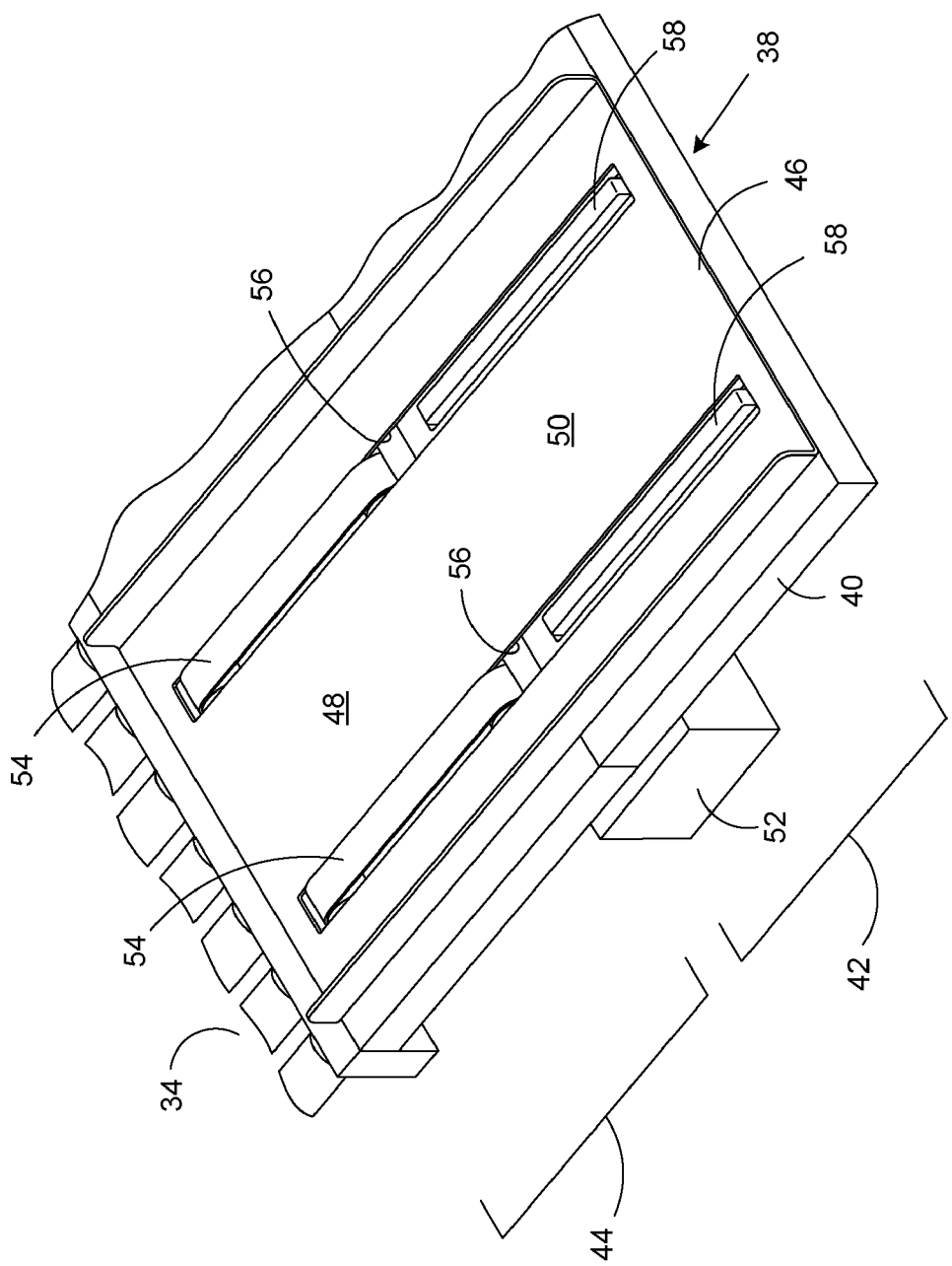
FIG. 3 is a partially schematic perspective view of a portion of a shuttle unit shown in FIG. 2.

The sorter system 10 further comprises the container shuttle system 32. An embodiment of the container shuttle system 32 is shown in FIGS. 2 and 3. In the illustrated embodiment of FIG. 2, the container shuttle system 32 comprises three shuttle units 38. Systems comprising other numbers of shuttle units 38 may also be used.

As shown, each shuttle unit 38 comprises a base 40 defining a loading area 42 proximate to the first conveyor 30 and a staging area 44 proximate to the second conveyor 34. The shuttle unit 38 also comprises a tray 46 disposed on the base 40 for receiving containers 26 on a first section 48 and a second section 50. In various stages of operation, the tray 46 may have containers 26 present in either or both sections 48, 50.

As shown in FIGS. 2 and 3, the tray 46 comprises raised side edges to prevent unwanted lateral motion of the containers 26. The ends of the tray 46 are open to allow the desired motion of the containers 26 toward the second conveyor 34.

The tray 46 is movable between a first position in which the first section 48 is in the loading area 42 and a second position in which the first section 48 is in the staging area 44. In the embodiment shown in FIG. 2, the tray 46 of the left shuttle unit 38 is in the second position and the trays 46 of the center and right shuttle units 38 are in the first position. As shown, with the tray 46 in the first position, the second section 50 extends beyond the base 40. In that configuration, the second section 50 is accessible to an operator, as described below.

In an embodiment, the shuttle system 38 further comprises a drive element 52, shown schematically in FIG. 3, for moving the tray 46. The drive element 52 may comprise a servo motor. Alternatively, the drive element 52 may comprise an air cylinder or other actuator. The sorter system 10 further comprises a controller 19, as discussed above, for controlling the drive element 52 to selectively move the tray 46 between the first position and the second position to allow a container 26 in the first section 48 and a container 26 in the second section 50 to receive items associated with different sorting schemes, as discussed below.

The shuttle unit 38 further comprises a transport device 54 for selectively moving a container 26 on the first section 48 of the tray 46 from the staging area 44 onto the second conveyor 34. The transport device 54 is selectively movable between a retracted position within the base 40 and an extended position in the staging area 44. The transport device 54 is shown in the extended position in FIG. 3.

In one embodiment, the transport device 54 is moved between the retracted and extended positions using a pneumatic actuator (not shown). Other types of actuators may also be used. As shown in FIG. 3, the tray 46 defines an opening 56 for receiving the transport device 54 in the extended position.

In a further embodiment, the transport device 54 comprises a conveyor belt. In the illustrated embodiment, two conveyor belts are used to engage the lower surface of a container 26 and move it from the staging area 44 onto the second conveyor 34. Systems utilizing a different number of conveyor belts may also be used. In addition, other types of transports may also be used.

In another embodiment, the shuttle unit 38 further comprises a retention device 58 for selectively engaging a container 26 in the loading area 42 to prevent movement of the container 26 with the tray 46. The retention device 58 is selectively movable between a retracted position within the base 40 and an extended position in the loading area 42. The retention device 58 is shown in the extended position in FIG. 3.

Similar to the transport device 54, in one embodiment the retention device 58 is moved between the retracted and extended positions using a pneumatic actuator (not shown). Other types of actuators may also be used. As shown in FIG. 3, the tray 46 defines an opening 56 for receiving the retention device 58 in the extended position. In the illustrated embodiment, the opening 56 comprises two slotted openings configured to accommodate either the transport device 54 or the retention device 58, depending on the position of the tray 46.

In one embodiment, the retention device 58 comprises a flat bar having a high friction surface. The flat bar is configured to engage a lower surface of a container 26 and prevent the container 26 from moving with the tray 46. In the illustrated embodiment, the retention device 58 comprises two flat bars coated with a high friction rubber material. Other materials may also be used. Further, the illustrated retention element 58 is configured to contact the lower surface of the container 26 and lift the container 26 off the tray 46.

One embodiment of the operation of the sorter system 10 is now described. Initially, one or more trays 46 are configured with two empty containers 26, one in the first section 48 and one in the second section 50. The middle tray in FIG. 2 is configured in that arrangement. Next, a set of items is loaded on the conveyor 13 of the feeder module 12. The items are then singulated in the singulation module 16 and each item is scanned in the scanning module 18. As discussed above, the scanned image is used by the controller 19 to determine the destination container 26 for the item. The items are fed through the system and onto the first conveyor 30.

The items travel on the first conveyor 30 above the containers 26 in the loading area 42. The diverters 36 are actuated to direct the items into respective containers 26 according to the designated sorting scheme. Eventually, the sorting of items to a container 26 is complete. This may occur when the container 26 is full or when there are no additional items to be directed to that container 26 under the designated sorting scheme.

When the sorting of items to a container 26 is complete, the drive element 52 is actuated to move the tray 46 between the first position, as indicated by the middle tray in FIG. 2, and the second position, as indicated by the left tray in FIG. 2. When the tray 46 moves to the second position, the full container 26 in the first section 48 is moved to the staging area 44 and the empty container 26 in the second section 50 is moved to the loading area 42. The empty container 26 in the loading area 42 is immediately ready to receive items from the first conveyor 30.

Next, the transport device 54, comprising two conveyor belts in the illustrated embodiment, moves from the retracted position within the base 40 to the extended position in the staging area 44. In the extended position, the conveyor belts pass through the openings 56 in the tray 46, engage the bottom of the container 26, and lift the container 26 slightly above the surface of the tray 46. As directed by the controller 19, the conveyor belts then actuate to move the container 26 from the staging area 44 onto the second conveyor 34. The conveyor belts then move to the retracted position.

At this point, the tray 46 is in the second position with a container 26 in the second section 50 in the loading area 42. Next, the retention device 58, comprising two flat bars in the illustrated embodiment, moves from the retracted position within the base 40 to the extended position in the loading area 42. In the extended position, the flat bars pass through the openings 56 in the tray 46, engage the bottom of the container 26, and lift the container 26 slightly above the surface of the tray 46. As directed by the controller 19, the tray 46 then moves from the second position to the first position without moving the container 26. The flat bars are then moved to the retracted position, setting the container 26 back on the surface of the tray 46 in the first section 48.

Thus, after this maneuver, the tray 46 is in the first position with one container 26 in the first section 48 disposed in the loading area 42, as indicated by the right tray in FIG. 2. With the tray 46 in the first position, the second section 50 extends beyond the base 40. In that configuration, the second section 50 is accessible to an operator who may now place an empty container 26 on the tray 46 in the second section 50. According to embodiments of the invention, an operator may avoid handling heavy containers because the partially- and fully-filled containers are moved onto the second conveyor 34 by the container shuttle system 32. An operator may be required to handle only empty containers.

In a further embodiment, the controller 19 may be configured to control the drive element 52 to selectively move the tray 46 between the first position and the second position to allow a container 26 in the first section 48 and a container 26 in the second section 50 to receive items associated with different sorting schemes. For example, instead of assigning a single sorting scheme, such as a postal code, for example, to a given loading area, two sorting schemes may be assigned to a given loading area. In operation, the controller 19 drives the tray 46 between the first and second positions to place the appropriate container 26 in the loading area 42 as respective items arrive.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. A sorter system, comprising:
 a first conveyor for transporting items to designated containers;
 a second conveyor for transporting containers containing the items; and
 a shuttle unit, comprising:
  a base defining a loading area proximate to the first conveyor and a staging area proximate to the second conveyor;
  a tray disposed on the base for receiving containers on a first section and a second section, wherein the tray is movable between a first position in which the first section is in the loading area and a second position in which the first section is in the staging area; and
  a transport device for selectively moving a container on the first section of the tray from the staging area onto the second conveyor.

2. The sorter system of claim 1, wherein the transport device is selectively movable between a retracted position within the base and an extended position in the staging area.

3. The sorter system of claim 2, wherein the tray defines an opening for receiving the transport device in the extended position.

4. The sorter system of claim 2, wherein the transport device comprises a conveyor belt.

5. The sorter system of claim 2, wherein the shuttle unit further comprises a retention device for selectively engaging a container in the loading area to prevent movement of the container with the tray.

6. The sorter system of claim 5, wherein the retention device is selectively movable between a retracted position within the base and an extended position in the loading area.

7. The sorter system of claim 6, wherein the tray defines an opening for receiving the retention device in the extended position.

8. The sorter system of claim 6, wherein the retention device is configured to lift the container off the tray.

9. The sorter system of claim 1, further comprising a plurality of shuttle units.

10. The sorter system of claim 1, wherein, with the tray in the first position, the second section is accessible to an operator.

11. The sorter system of claim 1, further comprising:
 a drive element for moving the tray; and
 a controller for controlling the drive element to selectively move the tray between the first position and the second position to allow a container in the first section and a container in the second section to receive items associated with different sorting schemes.

12. A method of sorting items, comprising:
 transporting items to designated containers using a first conveyor;
 transporting containers containing the items using a second conveyor;

receiving containers on a first section and a second section of a tray, wherein the tray is disposed on a base that defines a loading area proximate to the first conveyor and a staging area proximate to the second conveyor;

moving the tray between a first position in which the first section is in the loading area and a second position in which the first section is in the staging area; and selectively moving a container on the first section of the tray from the staging area onto the second conveyor using a transport device.

13. The method of claim 12, wherein the transport device is selectively movable between a retracted position within the base and an extended position in the staging area.

14. The method of claim 13, further comprising receiving the transport device in the extended position in an opening in the tray.

15. The method of claim 13, wherein the transport device comprises a conveyor belt.

16. The method of claim 13, further comprising selectively engaging a container in the loading area to prevent movement of the container with the tray using a retention device.

17. The method of claim 16, further comprising selectively moving the retention device between a retracted position within the base and an extended position in the loading area.

18. The method of claim 17, wherein the tray defines an opening for receiving the retention device in the extended position.

19. The method of claim 17, further comprising lifting the container off the tray using the retention device.

20. The method of claim 12, further comprising, with the tray in the first position, accessing the second section to add an empty container.

21. The method of claim 12, further comprising:

moving the tray using a drive element; and controlling the drive element using a controller to selectively move the tray between the first position and the second position to allow a container in the first section and a container in the second section to receive items associated with different sorting schemes.

* * * * *